US008833172B2

(12) United States Patent
Chiou

(10) Patent No.: US 8,833,172 B2
(45) Date of Patent: Sep. 16, 2014

(54) PRESSURE SENSING DEVICE WITH STEPPED CAVITY TO MINIMIZE THERMAL NOISE

(75) Inventor: Jen-Huang Albert Chiou, Libertyville, IL (US)

(73) Assignee: Continental Automotive Systems, Inc, Auburn Hills, MI (US)

( * ) Notice: Subject to any disclaimer, the term of this patent is extended or adjusted under 35 U.S.C. 154(b) by 196 days.

(21) Appl. No.: 13/534,362

(22) Filed: Jun. 27, 2012

(65) Prior Publication Data

US 2014/0000376 A1  Jan. 2, 2014

(51) Int. Cl.
G01L 19/04 (2006.01)
G01L 7/00 (2006.01)
G01L 9/00 (2006.01)
G01L 9/02 (2006.01)
G01L 9/06 (2006.01)

(52) U.S. Cl.
CPC ............... *G01L 9/025* (2013.01); *G01L 9/0054* (2013.01); *G01L 9/0052* (2013.01); *G01L 9/065* (2013.01); *G01L 19/04* (2013.01)
USPC ............................................. 73/708; 73/700

(58) Field of Classification Search
USPC .................................................. 73/708, 700
See application file for complete search history.

(56) References Cited

U.S. PATENT DOCUMENTS 5,759,870 A * 6/1998 Yun et al. ......................... 438/53
7,111,518 B1 * 9/2006 Allen et al. ...................... 73/715
2005/0172723 A1   8/2005 Kato et al.
2007/0052046 A1 * 3/2007 Chu et al. ....................... 257/415
2013/0192378 A1 * 8/2013 Chiou et al. .................... 73/721

FOREIGN PATENT DOCUMENTS

DE      4215722 A1 * 11/1993  ............... G01F 1/68
EP      1184646 A2 *  3/2002  ............. G01F 1/684
EP      1184646 A3    10/2002

OTHER PUBLICATIONS

Dr. A.D. Kurtz, A. Kane, S. Goodman, W. Landmann, L. Geras, and A. A. Ned, "High Accuracy Piezoresistive Internal Combustion Engine Transducers",Kulite Semiconductor Products, Inc. Presented at the Automotive Testing Expo 2004, Messe Stuttgart, Germany, May 25-27, 2004.*
U.S. Appl. No. 13/361,475, filed Jan. 30, 2012, Chiou et al.
Search Report dated Feb. 7, 2013, from corresponding GB Patent Application No. GB1218398.4.

* cited by examiner

*Primary Examiner* — Lisa Caputo
*Assistant Examiner* — Jamel Williams

(57) ABSTRACT

A pressure sensing element may include a diaphragm and a stepped cavity. The pressure sensing element may include a plurality of piezoresistors, which are operable to generate an electrical signal based on an amount of deflection of the diaphragm in response to a sensed pressure of the fluid. The pressure sensing element may be mounted onto a housing substrate using an adhesive so that a portion of the adhesive is attached to walls of a first cavity and to a step surface of the stepped cavity to redistribute thermally induced stresses on the pressure sensing element. The stepped cavity may be included in a MEMS pressure sensing element to reduce or eliminate thermal noise, such as temperature coefficient of offset voltage output (TCO).

20 Claims, 4 Drawing Sheets

PRESSURE SENSING DEVICE WITH STEPPED CAVITY TO MINIMIZE THERMAL NOISE

BACKGROUND

Embodiments of the invention relate to a microelectromechanical system (MEMS) pressure sensing element having a stepped cavity at the backside for reducing or eliminating thermal noise induced by thermal stresses, such as the temperature coefficient of offset voltage output (TCO).

MEMS pressure sensors are generally known. One type of pressure sensor is a differential pressure sensor, which includes a silicon pressure sensing element that is anodically bonded to a glass pedestal and mounted to a housing substrate using an adhesive. Many differential pressure sensors are used in applications in which the sensors are exposed to varying temperatures. This causes the sensing element, the glass pedestal, the adhesive, and the housing substrate to expand and contract in response to the temperature changes.

The pressure sensing element includes four piezoresistors or resistors positioned in what is known as a "Wheatstone Bridge" configuration to sense the stresses that are applied to the resistors. The glass pedestal is incorporated between the pressure sensing element and the adhesive such that the stresses resulting from the difference in thermal expansion among the pressure sensing element, the adhesive, and the housing substrate are isolated by the glass pedestal. The glass pedestal and the pressure sensing element have slightly different coefficients of thermal expansion, and therefore expand and contract at a lower different rate when exposed to varying temperatures. The glass pedestal essentially acts as a buffer to isolate the stresses resulting from the different expansion and contraction rates among the pressure sensing element, the adhesive, and the housing substrate.

An example of the pressure sensor discussed above is shown in FIG. 1 generally at 10. The sensor 10 includes a pressure sensing element 12, a glass pedestal 14, an adhesive 16, and a housing substrate 18. The pressure sensing element 12 shown in FIG. 1 is made from silicon, and is anodically bonded to the glass pedestal 14. The adhesive 16 is used to bond the glass pedestal 14 to the housing substrate 18.

Formed as part of the housing substrate 18 is a first aperture 20, and formed as part of the glass pedestal 14 is a second aperture 22, which is in substantial alignment with the first aperture 20. The second aperture 22 is in fluid communication with a cavity, shown generally at 24, where the cavity 24 is formed as part of the pressure sensing element 12. The pressure sensing element 12 includes four angular inner surfaces, where only a first angular inner surface 26 and a second angular inner surface 28 are depicted in the cross-sectional view of FIG. 1. Each of the four angular inner surfaces terminates into a bottom surface 30, which is part of a diaphragm 32. The pressure sensing element 12 also includes a top surface 34, and there is a picture-frame transducer or picture-frame Wheatstone bridge 36 doped onto the top surface 34 of the pressure sensing element 12. At least a thermal oxide layer and passivation layers are formed to protect the circuitry. The picture-frame Wheatstone bridge 36 is formed by four p-piezoresistors 36A-36D as shown in FIG. 2B. The four piezoresistors 36A-36D may also be formed as a distributed Wheatstone bridge 38A-38D as shown in FIG. 3 for pressure sensing.

The diaphragm 32 is relatively thin in the micron range, and the thickness of the diaphragm 32 depends upon the pressure range. The diaphragm 32 deflects upwardly and downwardly in response to pressure applied to the bottom surface 30, and the top surface 34 of the diaphragm 32. The pressure in the cavity 24 changes as a result of a pressure change of fluid flowing into and out of the apertures 20 and 22.

The deflections on the top surface 34 also deform the picture-frame Wheatstone bridge 36, which is doped onto the top surface 34 of the pressure sensing element 12. The pressure sensing element 12 is made of a single-crystal silicon (Si). On the top of the pressure sensing element 12, four p-piezoresistors 36A-36D are formed and connected to each other by p+ interconnectors 40 to form the picture-frame Wheatstone bridge 36 for pressure sensing as shown in FIGS. 2A-2B.

As used herein, the term Wheatstone bridge refers to the circuit topology shown in FIG. 2A-2B, namely the parallel connection of two series-connected resistors.

FIGS. 2A-2B represent a top view of the piezoresistive pressure sensing element 12 with the picture-frame Wheatstone bridge 36, which is doped on the diaphragm 32. The diaphragm 32 has dimensions of 780 µm×780 µm. The thickness of the diaphragm 32 is generally in the range of about 5 µm to 20 µm. The picture-frame Wheatstone bridge 36 is processed using conventional techniques to form four resistors 36A-36D on the top surface of the pressure sensing element 12. The resistors 36A-36D are formed as p− resistors, embodiments of which are well-known to those of ordinary skill in the semiconductor art. Electrical interconnects 40 made of p+ material connected to the bottom of bond pads 42A-42D are also formed on the top surface 34 of the pressure sensing element 12. Each interconnect 40 provides an electrical connection between two resistors in order to connect the resistors to each other to form a piezoresistive Wheatstone bridge circuit.

The four interconnects 40 are shown as part of the pressure sensing element 12. Each interconnect 40 extends outwardly from a point or node 44 between two of the four resistors 36 next to each other, and connects to the bottom of a metal bond pad 42. Each bond pad 42 is located near a side 46 of the top surface 34 of the pressure sensing element 12. Each interconnect 40 thus terminates at and connects to a bond pad 42.

FIG. 2A also shows an orientation fiducial 48 on the top surface 34. The fiducial 48 is a visually perceptible symbol or icon the function of which is simply to enable the orientation of the pressure sensing element 12.

Each bond pad 42 has a different label or name that indicates its purpose. The first bond pad 42A and the second bond pad 42B receive an input or supply voltage for the Wheatstone bridge circuit. Those two bond pads 42A, 42B are denominated as $V_p$ and $V_n$, respectively. The other two bond pads 42C, 42D are output signal nodes denominated as $S_p$ and $S_n$, respectively.

Many attempts have been made to simplify the construction of this type of pressure sensor 10 by eliminating the glass pedestal 14, and directly mounting the pressure sensing element 12 to the housing substrate 18 with the adhesive 16. However, the difference in thermal expansion among the housing substrate 18, the adhesive 16, and the pressure sensing element 12 has resulted in unwanted stresses being applied to the pressure sensing element 12, which then disrupts each of the resistors 36A-36D, causing an inaccurate pressure reading by the pressure sensing element 12.

More particularly, both experimental measurement and computer simulations of the structure depicted in FIG. 1 show that connecting the pressure sensing element 12 directly to the housing substrate 18 creates offset voltage output and its variation over an operating temperature range due to asymmetrical thermal stresses on the resistors 36A-36D. Elimination of the glass pedestal 14 causes one of the resistors 36A through 36D to deform and to change its resistance value asymmetrically with respect to the other resistors leading to an offset voltage output variation in an operating temperature range in the output of the pressure sensing element 12.

The offset voltage output variation over an operating temperature is called temperature coefficient of offset voltage output (TCO) and defined as follows:

TCO=(Vo at 150° C.–Vo at –40° C.)/190° C.

Where Vo at 150° C.: offset voltage output at 150° C. without pressure applied; and Vo at –40° C.: offset voltage output at –40° C. without pressure applied.

The pressure sensing element 12 is commonly used with an application-specific integrated circuit (ASIC). The ASIC is used for amplifying and calibrating the signal received from the pressure sensing element 12. It is desirable to keep the TCO between –50 uV/° C. and 50 uV/° C. so the ASIC is better able to handle any thermal noise.

It is difficult for an ASIC to compensate for a high TCO, especially when the adhesive 16 is not symmetrically dispensed. If the adhesive is not symmetrically dispensed, this can further reduce the accuracy of the sensor because the stress difference in the X and Y directions on each of the four resistors will be amplified. The difference between the offset voltage outputs at the low and high temperatures will, therefore, increase and so will the TCO. That is why the glass pedestal 14 shown in FIG. 1 is used to isolate the thermal stresses. In order to reduce cost and simplify the manufacturing process, it would be desirable to eliminate the glass pedestal. A pressure sensing element without a glass pedestal would also improve wire bonding stability and reliability. Therefore, a pressure sensor that does not have a glass pedestal and that has low TCO noise would advance the state of the art.

BRIEF SUMMARY

In accordance with embodiments of the invention, a pressure sensing element may include a diaphragm and a stepped cavity. The pressure sensing element may include a plurality of piezoresistors, which are operable to generate an electrical signal based on an amount of deflection of the diaphragm in response to a sensed pressure of the fluid. The pressure sensing element may be mounted onto a housing substrate using an adhesive so that a portion of the adhesive is attached to walls of a first cavity and to a step surface of the stepped cavity to redistribute thermally induced stresses on the pressure sensing. The stepped cavity may be included in a MEMS pressure sensing element to reduce or eliminate thermal noise, such as temperature coefficient of offset voltage output (TCO).

DETAILED DESCRIPTION

The following description of embodiment(s) is merely exemplary in nature and is in no way intended to limit the invention, its application, or uses.

Figure 4:
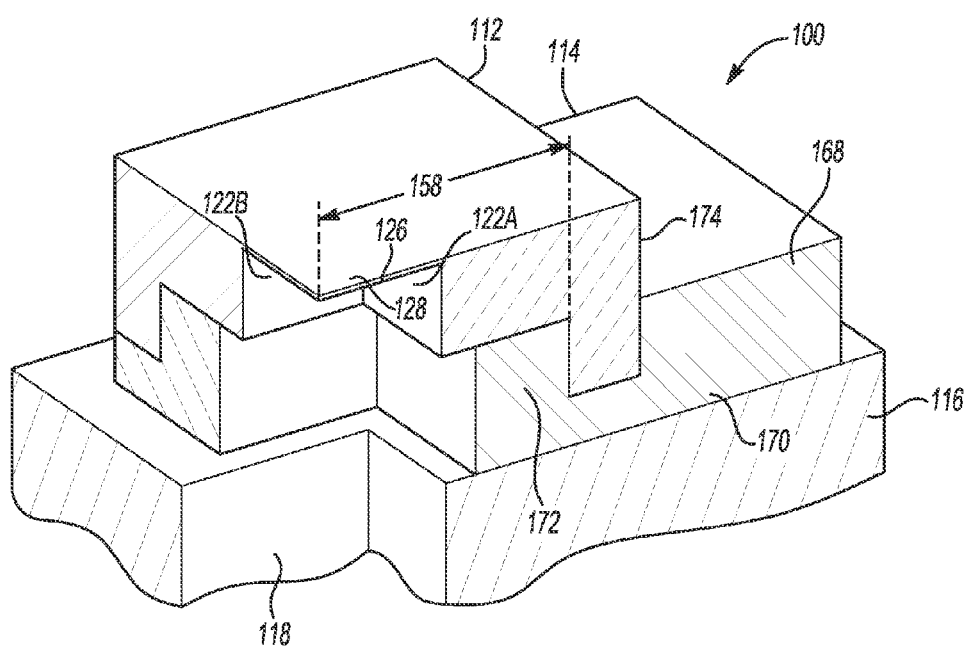
FIG. 4 is a perspective view of a section of a pressure sensing device, according to embodiments of the invention.
Figure 5:
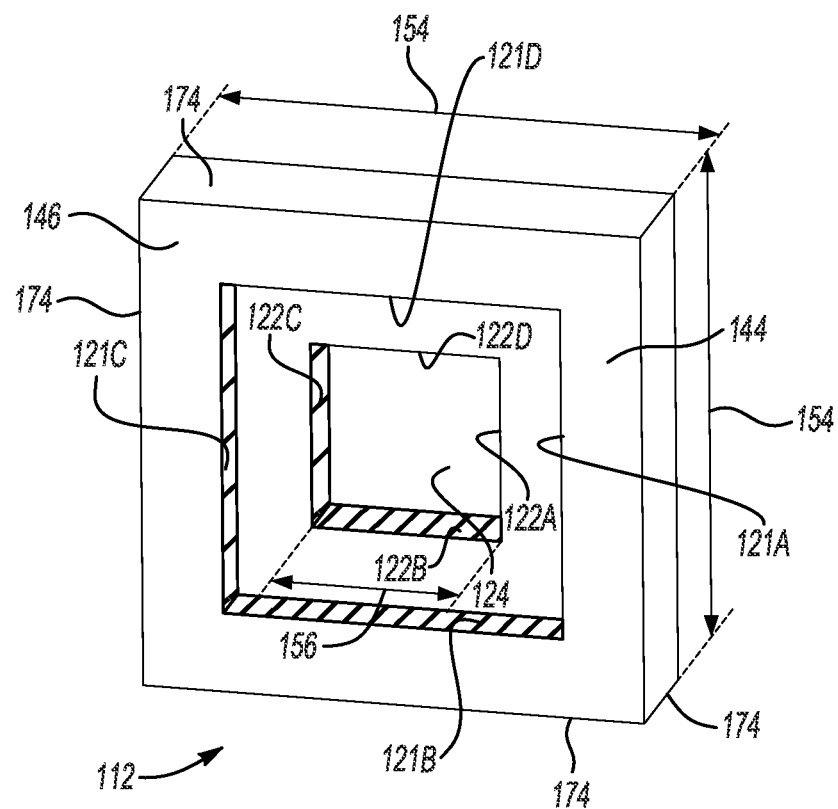
FIG. 5 is a perspective bottom view of a pressure sensing element used as part of a pressure sensing device, according to embodiments of the invention.
Figure 6:
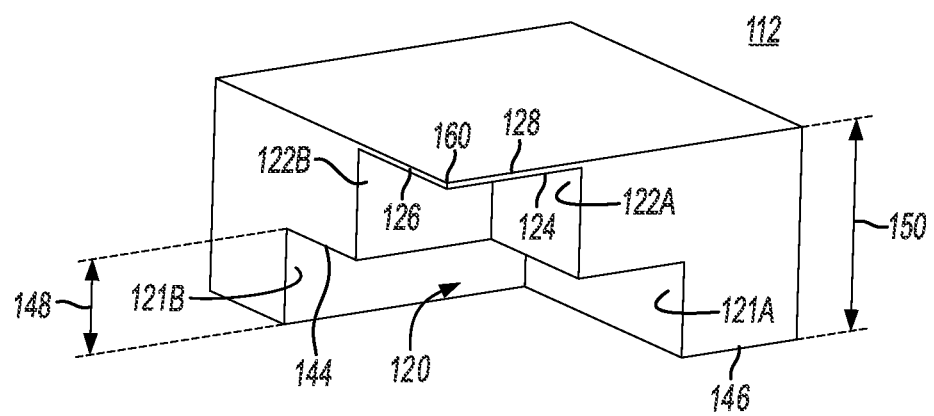
FIG. 6 is a perspective view of a quarter of a pressure sensing element used as part of a pressure sensing device, according to embodiments of the invention.
Figure 8:
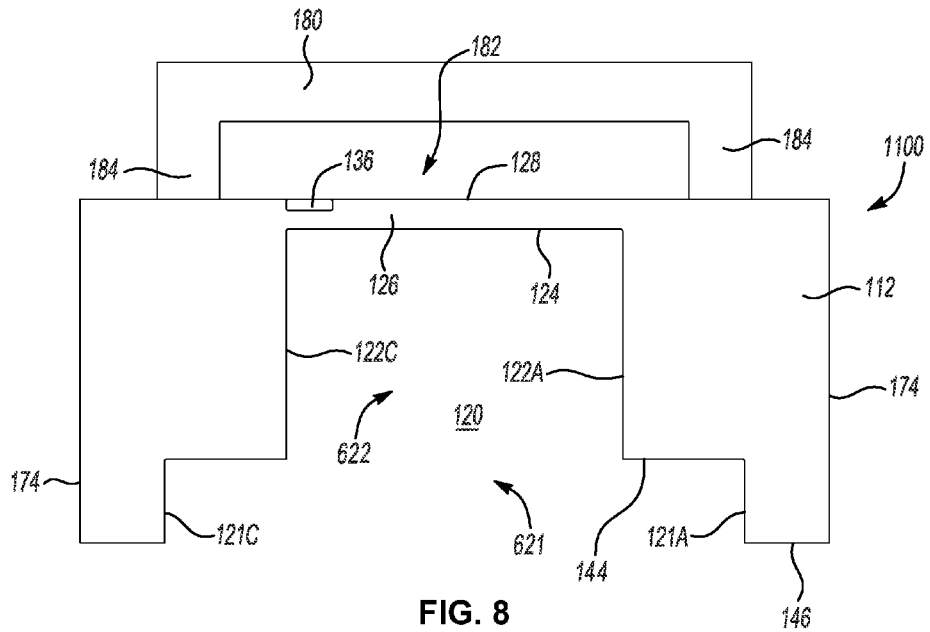
FIG. 8 is a cross-sectional view of a pressure sensing device for backside absolute pressure sensing, according to another embodiment of the invention.

A pressure sensing element according to embodiments of the invention is shown in FIGS. 4-6. The pressure sensing element can further comprise a cap as shown in FIG. 8 generally at 1100. The sensor 100 includes a pressure sensing element 112, an adhesive 114, and a housing substrate 116. FIG. 6 depicts a perspective view of a quarter of the pressure sensing element with a center 160 of the diaphragm 126. The pressure sensing element 112 shown in FIGS. 4-6 and FIG. 8 is made from silicon, and is mounted to the housing substrate 116 using the adhesive 114.

Formed as part of the housing substrate 116 is an aperture 118. The aperture 118 is in fluid communication with a stepped cavity 120, which is formed as part of the pressure sensing element 112. In one embodiment, the stepped cavity 120 is formed using a dry etch, deep reactive ion etches (DRIE), but it is within the scope of the invention that other processes may be used. The stepped cavity 120 as shown in FIGS. 5, 6, and 8 is formed into the base surface 146, by the walls 121 of the first cavity 621, the step surface 144, the walls 122 of the second cavity 622, and the bottom surface 124 of the diaphragm 126. In this way, the step surface may be considered as both an upper surface of the first cavity and a base surface into which the second cavity is formed. The stepped cavity 120 is located approximately at the center of the base surface of the pressure sensing element 112. According to some embodiments, each of the wall surfaces 121A-121D and 122A-122D is substantially perpendicular to the diaphragm 126, and the step surface 144 is substantially parallel to the diaphragm. In other embodiments, the wall surfaces may not be substantially perpendicular to the diaphragm, or the step surface may not be substantially parallel to the diaphragm. The pressure sensing element 112 also includes a top surface 128, and there is a picture-frame Wheatstone bridge, shown generally at 36, doped onto the top surface 128 of the pressure sensing element 112, which is the same type of picture-frame Wheatstone bridge 36 as the one shown in FIGS. 2A-2B.

The diaphragm 126 is relatively thin, and the thickness of the diaphragm 126 depends upon the pressure range. The diaphragm 126 deflects upwardly and downwardly in response to pressure applied to the bottom surface 124, and the top surface 128 of the diaphragm 126 as shown in FIG. 4. The pressure in the stepped cavity 120 changes as a result of a pressure change of a fluid in the aperture 118.

The deflections on the top surface 128 of the diaphragm 126 deform the picture-frame Wheatstone bridge 36 doped onto the top surface 128 of the pressure sensing element 112.

Figure 2A:
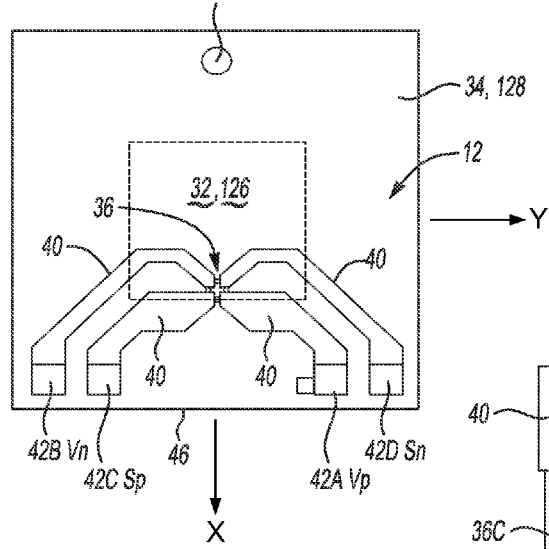
FIG. 2A is a top view of a piezoresistive pressure sensing element used with a prior art pressure sensor.
Figure 2B:
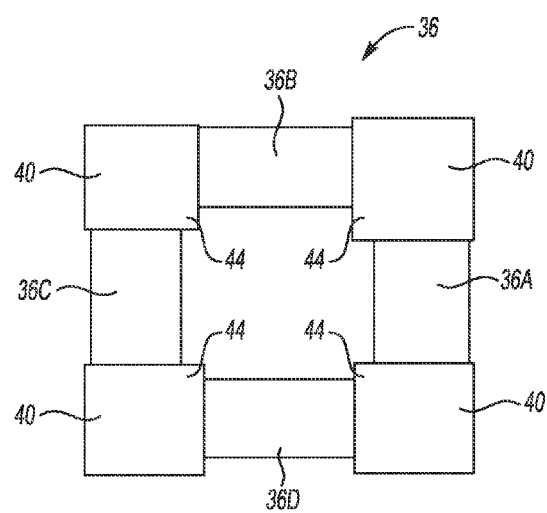
FIG. 2B is an enlarged view of the pressure sensing element shown in FIG. 2A, which shows a picture-frame Wheatstone bridge.
Figure 3:
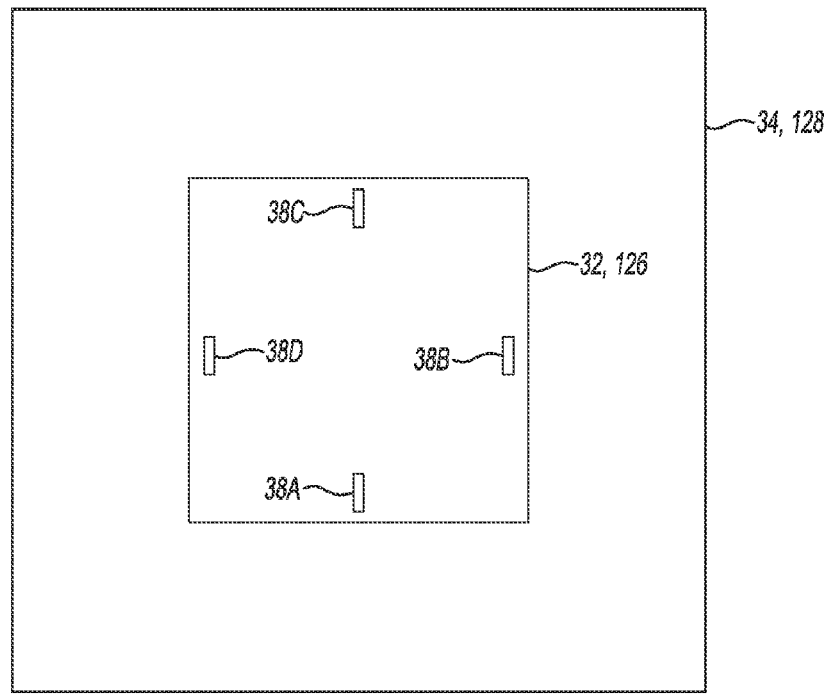
FIG. 3 is a top view of a prior art distributed Wheatstone bridge on the pressure sensing element.

On the top surface 128 of the pressure sensing element 112, four piezoresistors are formed and connected to each other to form a Wheatstone bridge for pressure sensing, as shown in FIGS. 2A and 2B. In this embodiment, the Wheatstone bridge is a picture-frame Wheatstone bridge 36, and is configured as shown in FIG. 2A-2B, and the four resistors 36A-36D are located near one side of the diaphragm 126. However, it is within the scope of the invention that the Wheatstone bridge may be configured as a distributed Wheatstone bridge circuit, shown in FIG. 3, where each resistor 38A-38D is located near a respective side of the diaphragm 126.

In this embodiment, the Wheatstone bridge includes the plurality of resistors 36A-36D, the plurality of electrical interconnects 40, the plurality of bond pads 42, and the nodes 44. With this embodiment, the bond pads 42 are located near a side 46 of the top surface 128 of the pressure sensing element 112. The pressure sensing element in this embodiment also includes a fiducial 48 which is used for orienting the pressure sensing element during assembly.

A Wheatstone bridge circuit has two input nodes and two output nodes. The transfer function, which is the ratio of the output voltage to the input voltage, can be expressed as shown in Eq. 1 below.

$$\frac{V_{out}}{V_{in}} = \left( \frac{R_3}{R_3 + R_4} - \frac{R_2}{R_1 + R_2} \right) \quad (1)$$

Rearranging the transfer function terms provides an equation for the output voltage $V_{out}$ as a function of the input voltage $V_{in}$ and values of the resistors in the Wheatstone bridge. Equation 2 below thus expresses the output voltage as a function of the input voltage and the values of the resistors that comprise the Wheatstone bridge circuit.

$$V_{out} = \left( \frac{R_3}{R_3 + R_4} - \frac{R_2}{R_1 + R_2} \right) V_{in} \quad (2)$$

It can be seen from Eq. 2 that the output voltage changes as the resistors' values change induced by pressure, temperature change, thermal mismatch, etc. A thermal mismatch exists among the pressure sensing element 112, the adhesive and the housing substrate 116, which has an effect on the output voltage.

Equation 3 below expresses the output voltage as a function of the fluctuations in resistance values.

$$V_{out} = \sum_{i=1}^{4} \left( \frac{\partial V_{out}}{\partial R_i} \right) \Delta R_i \quad (3)$$

Expanding Equation 3 into Equation 4 below shows that $V_{out}$ will vary with changes in each of the resistors R1 through R4.

$$V_{out} = \frac{V_{in}}{4} \left( \frac{\Delta R_1}{R_1} - \frac{\Delta R_2}{R_2} + \frac{\Delta R_3}{R_3} - \frac{\Delta R_4}{R_4} \right) \quad (4)$$

For a piezoresistive device, the ratio of the resistance change versus the resistance for each resistor can be expressed as follows:

$$\frac{\Delta R_i}{R_i} = \frac{\pi_{44}}{2} (\sigma_i^L - \sigma_i^T)$$

$\sigma_i^L$: longitudinal stress on the resistor i
$\sigma_i^T$: transverse stress on the resistor i and the value of piezoresistive coefficient, $\pi_{44}$ is approximately 1.381/GPa with a boron doping density of 1.8E15/cm^3.

Equation 4 shows that the value for the ratio of the resistance change versus the resistance for each resistor is dependent on the longitudinal and transverse stresses on each resistor. If the longitudinal stresses on Resistor 1 and 3 are aligned to be perpendicular to the edge of the diaphragm, then the transverse stresses on Resistor 2 and 4 is also perpendicular to the edge of the diaphragm. Referring to the coordinate system as shown in FIG. 2A, the stress perpendicular to the edge of the diaphragm is denominated as Sxx. In this condition, the transverse stresses on Resistor 1 and 3 and the longitudinal stresses on Resistor 2 and 4 will be parallel to the edge of the diaphragm. The stress parallel to the edge of the diaphragm is denominated as Syy. Therefore, Equation 4 can be re-written as Equation 5 below.

$$V_{out} = \frac{\pi_{44} V_{in}}{2} \times \frac{1}{4} \sum_{i=1}^{4} (Sxx - Syy)_i \quad (5)$$

$V_{out}$ is thus a function of the sum of the differential stresses, (Sxx−Syy) on all of the four resistors. According to Equation 5, when the pressure sensor device is under pressure, the stress perpendicular to the diaphragm on each resistor, Sxx is higher than the stress parallel to the diaphragm on each resistor, Syy. Therefore the pressure sensor device has a high sensitivity. In order to minimize the thermal noise, however, it is desirable to keep the voltage output, or the offset voltage output in this condition as low as possible, and preferably zero for the noise induced by the thermal stress. Based on Equation 5, it is apparent that if thermally-induced stresses Sxx and Syy can be equalized or the sum of (Sxx−Syy) can be reduced to zero, the offset voltage output becomes zero due to the cancellation of the stresses. Once the offset voltage outputs are reduced to approximately zero at different temperature levels, the TCO is essentially zero.

The operating temperature range of the sensor 100 is between about −40° C. and about +150° C. The difference in the coefficients of thermal expansion between the pressure sensing element 112, the adhesive 114, and the housing substrate 116 creates an imbalance among the stresses applied to the various resistors 36. This imbalance is corrected by the stepped cavity, shown generally at 120. In this way, the stepped cavity 120 eliminates the need for the glass pedestal 14, thereby advantageously reducing the cost of the pressure sensor 100.

The depth 148 of the stepped cavity 120 is generally from about one quarter to two-thirds of the thickness 150 of the pressure sensing element 112, and is preferably about one-third to one-half of the thickness 150 of the pressure sensing element 112. The thickness 150 of the pressure sensing element 112 is about 0.525 mm, and the first cavity of the stepped cavity 120 is generally in the range of 1.4 to 1.6 mm, and is preferably about 1.58 mm. Numeral 158 shows half a width of the first cavity in FIG. 4. The pressure sensing element 112 is essentially square-shaped, and the width 154 of each side of the pressure sensing element 112 is about 2.06 mm, and the width 156 of each side of the diaphragm 126 is about 0.78 mm.

Figure 1:
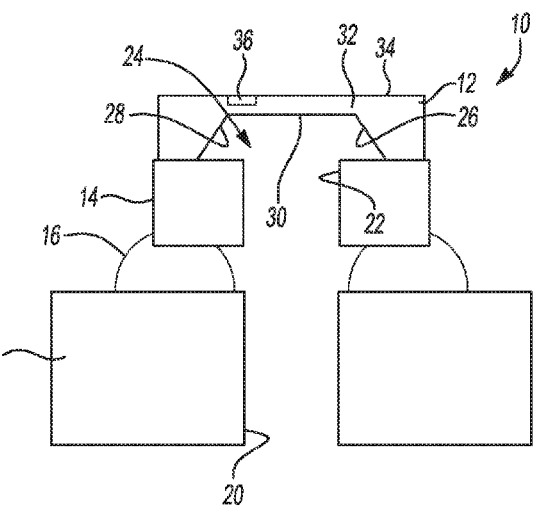
FIG. 1 is a cross-sectional view of a prior art pressure sensor.

The walls of the first cavity 121A-121D and the walls of the second cavity 122A-122D being substantially vertical provide for the pressure sensing element 112 to be made smaller compared to the pressure sensing element 12 shown in FIG. 1, which is an improvement over the design which includes the angled surfaces 26,28 shown in FIG. 1. The reduced size of the pressure sensing element 112 allows for installation and use in a wider arrangement of locations, such as location where space or weight is limited. The incorporation of the stepped cavity 120 creates a hold-down force on the step surface 144 by the inner fillet 172 of adhesive and more uniformly holds down the area surrounding the diaphragm 126 above the step surface 144, redistributes the thermal stresses induced by the adhesive 114 and the housing substrate 116, and significantly compresses the resistors 36A-36D in the direction perpendicular to the diaphragm 126 (Sxx), while gently compressing the resistors 36A-36D in the direction parallel to the diaphragm 126 (Syy). The diaphragm 126, especially in the area of the picture-frame Wheatstone bridge 36, experiences more equally compressive stresses in both the X and Y directions.

During assembly, the pressure sensing element 112 is attached to the housing substrate 116 using the adhesive 114. A scenario that presents an extreme TCO case is when, as the pressure sensing element 112 is placed onto the adhesive 114, the adhesive 114 partially fills the first cavity 621 and at least partially surrounds two of the substantially vertical outer surfaces 174 on two opposite sides of the pressure sensing element 112. The adhesive 114 provides a secure connection between the housing substrate 116 and the pressure sensing element 112. During assembly, the adhesive 114 is deformable and when assembled, the adhesive 114 has an outer fillet portion 168, a base portion 170, and an inner fillet portion 172. The portion of the adhesive 114 that surrounds two of the outer surfaces 174 is the outer fillet portion 168, best shown in FIG. 4.

When the sensor 100 is used in operation, and exposed to various temperatures, the pressure sensing element 112, the adhesive 114, and the housing substrate 116 have different coefficients of thermal expansion, and therefore expand and contract at different rates. The stepped cavity 120 is used to offset the various stresses which result from the difference in rates of thermal expansion of the pressure sensing element 112, the adhesive 114, and the housing substrate 116.

Figure 7:
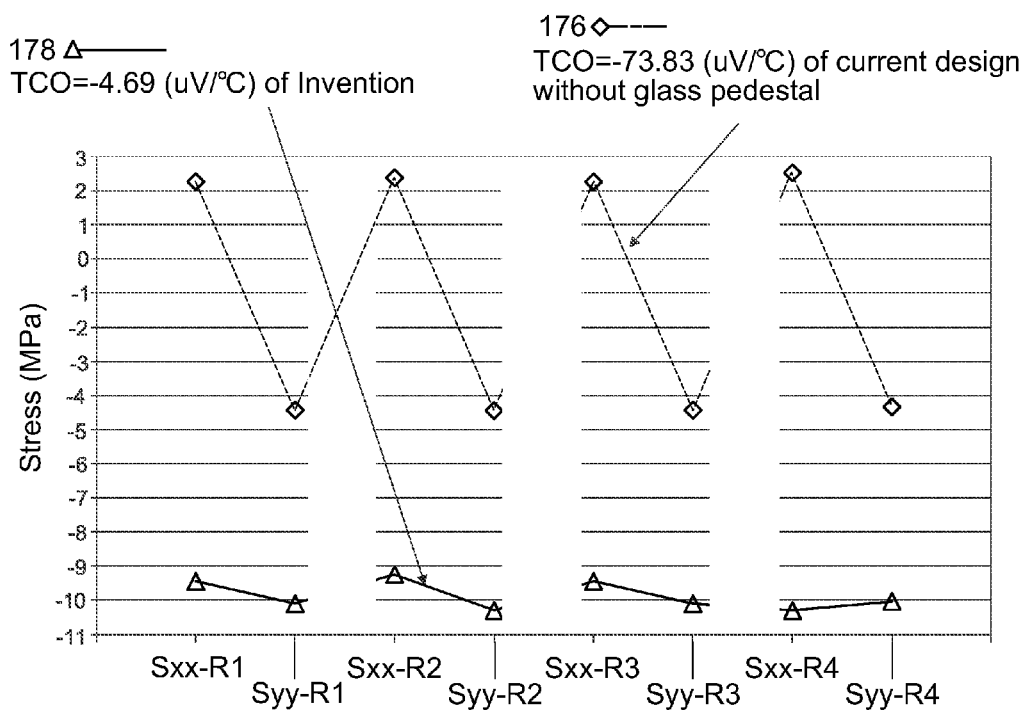
FIG. 7 is a graph representing the comparison and improvement in reduction of thermal stress difference in the X and Y directions on each resistor between a prior art pressure sensing device and a pressure sensing device according to embodiments of the invention.

Since the curing temperature is at 150° C., the thermal stress components Sxx and Syy are trivial because there is very little thermal mismatch. However, the thermal stress components Sxx and Syy are significant at −40° C. because the thermal mismatch is significant. FIG. 7 shows at −40° C. a comparison of the stress components Sxx and Syy between a pressure sensor having the stepped cavity 120, and a pressure sensor which does not have the stepped cavity 120. In FIG. 7, reference numeral 176 shows the stress components Sxx and Syy on each of the four resistors 36 without a stepped cavity added to the pressure sensing element 112. For convenience, Resistors 36A-36D are named R1, R2, R3, and R4, respectively. The stress differences (Sxx−Syy) on the four resistors are all positive. Thus the sum of all (Sxx−Syy) on all four resistors is greatly positive and results in a positive voltage of 14.03 mV. At 150° C., the thermal stress components Sxx and Syy on each resistor are trivial, and the stress difference (Sxx−Syy) on each resistor is near zero. The same is true for the sum of stress differences on all four resistors.

Hence the offset voltage output at 150° C. is approximately zero. Based on the definition of TCO, the value of TCO is calculated as −73.83 uV/° C.

Experimental and computer simulations show that the TCO is approximately proportional to the offset voltage output at −40° C. In order to reduce or minimize the TCO, it is important to reduce or minimize the offset voltage output at −40° C. Numeral 178 in FIG. 7 shows that $(Sxx-Syy)_1$, $(Sxx-Syy)_2$, and $(Sxx-Syy)_3$ are all slightly positive except that $(Sxx-Syy)_4$ is slightly negative. Thus the sum of all of these smaller (Sxx−Syy) on all four resistors is slightly positive and results in a positive voltage of 0.89 mV. The sum of all (Sxx−Syy) is significantly reduced, and so the offset voltage output at −40° C. is minimized to a small positive value. TCO is thus reduced to a small negative value at −4.69 uV/° C.

Another embodiment of the invention is shown at 1100 in FIG. 8, with like numbers referring to like elements. In this embodiment, a cap 180 is attached to the top surface 128 of the pressure sensing element 112. In some embodiments, the cap 180 may be made of silicon or glass, such as borosilicate glass. In this embodiment, the cap 180 is made of silicon and fusion bonded to the top surface 128 of the pressure sensing element 112. However, if the cap 180 is made of glass, the cap 180 could be anodically bonded to the top surface 128 of the pressure sensing element 112.

The cap 180 includes a chamber, shown generally at 182, located between sidewalls 184. The cap 180 is bonded to the top surface 128 of the pressure sensing element 112 such that the chamber 182 is a vacuum chamber, which functions as a zero pressure reference when the diaphragm 126 is exposed to the media. This allows the pressure sensor 1100 shown in FIG. 8 to measure a backside absolute pressure, whereas the pressure sensor 100 shown in the previous embodiments measures differential pressure. The length and width of the chamber 182 is at least as large as the length and width of the diaphragm 126. The cap 180 isolates the diaphragm 126 from the media from the top side and protects the diaphragm 126 from harsh environments, reducing the probability of damage occurring to the circuitry on the top surface 128 of the pressure sensing element 112.

The foregoing description is for purposes of illustration only. The true scope of the invention is defined by the appurtenant claims.

The invention claimed is:

1. An apparatus, comprising:
   a pressure sensing element including:
      a stepped cavity formed into a base surface of the pressure sensing element, by a plurality of walls of a first cavity, a step surface, a plurality of walls of a second cavity, and a bottom surface of a diaphragm; and
      a plurality of piezoresistors on a top surface of the diaphragm;
   at least one substrate; and
   an adhesive that connects the substrate to the base surface such that the walls of the first cavity and the step surface of the stepped cavity are adhered to at least a portion of the adhesive;
   wherein the adhesive further comprises:
   a base portion;
   an outer fillet portion integrally formed with the base portion, the outer fillet portion adjacent the at least one outer surface when the pressure sensing element is connected to the at least one substrate; and
   an inner fillet portion integrally formed with the base portion, the inner fillet portion substantially disposed in the first cavity when the pressure sensing element is connected to the at least one substrate.

2. An apparatus, comprising:
a pressure sensing element including:
- a stepped cavity formed into a base surface of the pressure sensing element, by a plurality of walls of a first cavity, a step surface, a plurality of walls of a second cavity, and a bottom surface of a diaphragm; and
- a plurality of piezoresistors on a top surface of the diaphragm;

at least one substrate; and
an adhesive that connects the substrate to the base surface such that the walls of the first cavity and the step surface of the stepped cavity are adhered to at least a portion of the adhesive;
wherein the portion of the adhesive that is attached to the walls of the first cavity and to the step surface redistributes the thermally induced stresses on the pressure sensing element to minimize pressure sensing inaccuracies caused by thermally induced stresses on the pressure sensing element.

3. The apparatus of claim 1, wherein a depth of the first cavity is approximately one quarter to two-thirds of the thickness of the pressure sensing element.

4. The apparatus of claim 1, wherein the depth of the first cavity is approximately one-third to one-half of the thickness of the pressure sensing element.

5. The apparatus of claim 1, further comprising:
a cap connected to the top surface of the pressure sensing element; and
a chamber integrally formed between the cap and the top surface of the pressure sensing element such that the chamber is at least partially evacuated.

6. The apparatus of claim 5, wherein the cap is made of a borosilicate glass.

7. The apparatus of claim 5, wherein the cap is made of silicon.

8. The apparatus of claim 1, wherein the plurality of piezoresistors are configured to be a picture-frame Wheatstone bridge.

9. The apparatus of claim 1, wherein the plurality of piezoresistors are configured to be a distributed Wheatstone bridge.

10. The apparatus of claim 1, wherein the plurality of walls of the first and second cavities are substantially perpendicular to the diaphragm.

11. The apparatus of claim 1, wherein the step surface is substantially parallel to the diaphragm.

12. The apparatus of claim 2, wherein a depth of the first cavity is approximately one quarter to two-thirds of the thickness of the pressure sensing element.

13. The apparatus of claim 2, wherein the depth of the first cavity is approximately one-third to one-half of the thickness of the pressure sensing element.

14. The apparatus of claim 2, further comprising:
a cap connected to the top surface of the pressure sensing element; and
a chamber integrally formed between the cap and the top surface of the pressure sensing element such that the chamber is at least partially evacuated.

15. The apparatus of claim 14, wherein the cap is made of a borosilicate glass.

16. The apparatus of claim 14, wherein the cap is made of silicon.

17. The apparatus of claim 2, wherein the plurality of piezoresistors are configured to be a picture-frame Wheatstone bridge.

18. The apparatus of claim 2, wherein the plurality of piezoresistors are configured to be a distributed Wheatstone bridge.

19. The apparatus of claim 2, wherein the plurality of walls of the first and second cavities are substantially perpendicular to the diaphragm.

20. The apparatus of claim 2, wherein the step surface is substantially parallel to the diaphragm.

* * * * *